(12) United States Patent
Montard et al.

(10) Patent No.: US 7,801,221 B2
(45) Date of Patent: Sep. 21, 2010

(54) METHOD AND SYSTEM FOR MEASURING VIDEO IMAGE DEGRADATIONS INTRODUCED BY AN ENCODING SYSTEM WITH THROUGHPUT REDUCTION

(75) Inventors: Nathalie Montard, Metz (FR); Jamal Baina, Champigneule (FR)

(73) Assignee: TDF, Metz (FR)

( * ) Notice: Subject to any disclaimer, the term of this patent is extended or adjusted under 35 U.S.C. 154(b) by 1343 days.

(21) Appl. No.: 10/530,531

(22) PCT Filed: Oct. 22, 2003

(86) PCT No.: PCT/FR03/03132

§ 371 (c)(1),
(2), (4) Date: Nov. 17, 2005

(87) PCT Pub. No.: WO2004/047451

PCT Pub. Date: Jun. 3, 2004

(65) Prior Publication Data

US 2006/0140266 A1    Jun. 29, 2006

(30) Foreign Application Priority Data

Nov. 15, 2002    (FR)    ................... 02 14329

(51) Int. Cl.
*H04B 1/66*    (2006.01)
*H04N 7/12*    (2006.01)
*H04N 11/02*    (2006.01)
*H04N 11/04*    (2006.01)

(52) U.S. Cl. .............. 375/240.2; 375/240.24
(58) Field of Classification Search .............. 375/240.2, 375/240.24
See application file for complete search history.

(56) References Cited

U.S. PATENT DOCUMENTS

| | | | | |
|---|---|---|---|---|
| 5,214,507 | A | * | 5/1993 | Aravind et al. ........... 348/390.1 |
| 6,437,821 | B1 | * | 8/2002 | Janko et al. ................. 348/180 |
| 6,594,310 | B1 | * | 7/2003 | Marques et al. ............. 375/240 |
| 2004/0114685 | A1 | * | 6/2004 | Kouloheris et al. .... 375/240.03 |

FOREIGN PATENT DOCUMENTS

| | | |
|---|---|---|
| EP | 1 111 928 A1 | 6/2001 |
| FR | 2 769 452 | 4/1999 |
| FR | 2 769 453 | 4/1999 |

* cited by examiner

*Primary Examiner*—Marsha D Banks Harold
*Assistant Examiner*—Jessica Roberts
(74) *Attorney, Agent, or Firm*—Bachman & LaPointe, P.C.

(57) ABSTRACT

A method of measuring the degradations in a digitized image, which are introduced during the encoding of the image is provided. The method consists in: retrieving the block decomposition of the image used during the encoding thereof; offsetting the coding grid in relation to the image such as to define an analysis block decomposition of the image, whereby each analysis block covers a boundary between two adjacent blocks; applying a transform calculation to the pixel data of the image which is encoded using the offset coding grid; extracting the transformed coefficients obtained for each analysis block, coefficients which are likely to be affected by a block effect; applying an inverse transform calculation to the extracted transformed coefficients in order to determine the pixel data of each analysis block; and, for each analysis block, calculating a degradation indicator and, subsequently, the degradation of the image from the degradation indicators for each analysis block.

26 Claims, 3 Drawing Sheets

METHOD AND SYSTEM FOR MEASURING VIDEO IMAGE DEGRADATIONS INTRODUCED BY AN ENCODING SYSTEM WITH THROUGHPUT REDUCTION

BACKGROUND OF THE INVENTION (1) Field of the Invention

This invention relates to a method and system for measuring degradations of a video image introduced by a coding system with reduction in throughput.

It is particularly but not exclusively applicable to the domain of low throughput or very low throughput digital audiovisual signal distribution networks, and to the domain of production of such signals. It is particularly applicable to surveillance of the service quality of a digital audiovisual signal broadcast network.

(2) Prior Art

Digitizing of video signals provides a means for copying, storing and transmitting this type of information while maintaining a constant image quality. However, in practice, the large quantity of information transferred by video images requires the use of digital compression methods to reduce the binary throughput.

A compression method that is very widely used in video is described in standard ISO/CEI 13918 MPEG2. This algorithm is said to be of the "with losses" type since the restored image after decoding is not identical to the original. This algorithm is based on a division of the image into blocks and application of a transform, for example of the discrete cosine transform type, to the pixels in each block to obtain a frequency representation of the luminance amplitude of pixels in the form of one coefficient for each pixel in the block.

In order to maintain an acceptable quality for the final television viewer, the compression algorithms take into account perception properties of the human vision system. However, throughput constraints imposed by transmission systems require the application of compression ratios that have an influence on the image quality perceived by the television viewer.

It is found that the importance of degradations caused by coding depends both on the compression ratio and the complexity of images. These degradations are particularly important when the image is more complex, and particularly related to movement of objects, brightness and texture.

The degradations that appear in the images following application of the MPEG2 coding technique include granular errors, deformations of contours, the appearance of so-called "exotic" contours and block effects.

Therefore it would appear necessary to continuously evaluate the quality of broadcast images. There are widely used subjective evaluation methods for this purpose, that make use of human evaluation. However, these methods are difficult to use and cannot be used on a broadcasting network in operation in real time.

There are other so-called "with reference" methods based on comparison of the image for which the quality is to be evaluated with a reference image. The reference image is usually an image that corresponds to the image to be analyzed before it is coded and/or transmitted. This solution is not very practical, because it requires access to one or several reference images. Furthermore if the video image is transmitted, there is also the problem of transporting the reference image to the place at which the image to be analyzed is received.

Other so-called "without reference" solutions are used to automatically analyze images without needing to make a comparison with reference images. The efficiency and robustness of each of these solutions lies in the method used to measure parameters related to image quality.

Some of these solutions are based on detection of the block effect made in the spatial domain by gradient calculations at block boundaries. To avoid confusion between the boundary of an object in the image with a block effect, the gradient is compared with intra-block gradients. The block effect is detected by means of a decision criterion applied to the behaviour of inter block and intra block gradients.

Thus, the Rohde & Schwarz Company has developed a block effect detection method consisting of calculating a horizontal gradient vector for each macro block in the image, and calculating an average of each component of the vector over the entire image. Variations of components of this vector over time are used to bring out components with marginal behaviour that represent block boundaries degraded by the compression processing transform. Detection of these marginal components provides a means for determining a block effect detection criterion representative of the image degradation.

This principle for calculating the gradient is also described in patent FR 2 805 429 filed by the Applicant. This patent application describes a method based on the combination of a binary gradient image and a movement "pseudo vectors" image calculated from at least two successive images. A combination of these two images provides a means for estimating a ratio of false contours in the image, and is then used to evaluate a quality mark.

In patent FR 2 785 116 filed by the applicant, the gradients calculated on the entire image to be analyzed are passed through psychovisual filters that translate the contextual masking effect. A ratio of boundaries of detected visible blocks is then calculated searching for a pseudo periodicity among high value gradients, the image quality being evaluated based on this ratio.

It is found that methods based on the calculation of gradients apply filters to only consider a certain type of image contents: boundaries or high frequencies. Therefore these methods can only be used to analyze part of information contained in the image. The result is that they have limited reliability in terms of detection of image degradations. Furthermore, methods based on the use of gradients to estimate the boundary or for the detection of contours on the image are relatively sensitive to noise, which affects the reliability of the estimate of the quality of the intrinsic content of the image.

Furthermore, methods based on the calculation of the average on the entire image drastically reduce the importance of degradations located in a part of the image, which makes it difficult to detect such local degradations and therefore affects the reliability with which the image quality is evaluated.

Some methods allow an analysis on several successive images, to reduce these disadvantages. Therefore these methods cannot be used to analyze an isolated image outside the scope of the video.

SUMMARY OF THE INVENTION

The purpose of the present invention is to eliminate these disadvantages. This purpose is achieved by providing a method for measuring degradations of a digitized image, introduced when coding the image, the method consisting of dividing the image into coding blocks using a coding grid and applying a coding processing on pixel data in each block, making use of a block transform calculation and an inverse block transform calculation. According to the invention, this process includes steps of:

determining the coding grid of the coded image, in order to find the image division into coding blocks, used when coding the image, shifting the coding grid with respect to the coded image, so as to define an image division into analysis blocks each covering a boundary between two adjacent coding blocks, applying the block transform calculation to pixel data in the coded image using the shifted coding grid to obtain transformed coefficients for each analysis block defined by the shifted coding grid, extracting coefficients that could be affected by a block effect resulting from coding of the image, from the transformed coefficients, applying the inverse block transform calculation to the extracted transformed coefficients to determine the pixel data for each analysis block, for each analysis block, estimating an indicator of the degradation due to block effects, using pixel data in the coded image and pixel data in each analysis block, obtained by the inverse transform calculation, and determining an image degradation measurement by summing the degradation indicators of each analysis block.

According to a special feature of the invention, the estimation of a degradation indicator for each analysis block comprises steps of:

calculating an average of inter pixel differences at the inter block boundary of the coding grid, covered by the analysis block, using pixel data obtained for the analysis block, calculating an average and a standard deviation applicable to pixels in the two adjacent blocks on the coding grid, partially covered by the analysis block, calculating a weighting factor as a function of the average and the standard deviation obtained for the analysis block, and calculating a spatial activity of the analysis block using spatial activities determined for each of the two adjacent blocks in the coding grid partially covered by the analysis block, the analysis block degradation indicator being determined as a function of the calculated average of inter pixel differences, the weighting factor and the spatial activity of the block.

Advantageously, the analysis block degradation indicator is obtained using the following formula:

$$v_{i,j} = \frac{\Delta I_{i,j} w_{i,j}}{1 + \psi |ACT_{i,j}|}$$

in which $\Delta I_{i,j}$ is the average of inter pixel differences at the inter block boundary of the coding grid covered by the analysis block, $w_{i,j}$ is the weighting factor, $\Psi$ is a predefined constant, and $ACT_{i,j}$ is the spatial activity of the analysis block.

According to another special feature of the invention, the transform calculation is applied to coding blocks of the coded image, the spatial activities determined for each of the two coding blocks being obtained from the transformed coefficients for each of the two coding blocks.

Advantageously, the spatial activities determined for each of the two coding blocks are obtained from the following formulas:

$$ACT_{i,j}^G = \frac{1}{1 + DC_{i,j}^G} \sqrt{\sum_{\substack{u,v=0 \\ u+v \neq 0}}^{7} [AC_{i,j}^G(u,v) Nill(u,v)]^2}$$

$$ACT_{i,j}^D = \frac{1}{1 + DC_{i,j}^D} \sqrt{\sum_{\substack{u,v=0 \\ u+v \neq 0}}^{7} [AC_{i,j}^D(u,v) Nill(u,v)]^2}$$

in which $DC_{i,j}^G$ and $AC_{i,j}^G(u,v)$ and $D_{i,j}^D$ and $AC_{i,j}^D(u,v)$ are the transformed coefficients for each of the two adjacent coding blocks partially covered by the analysis block, and $Nill(u,v)$ is a masking function modelling masking by neighbourhood.

Preferably, the average and standard deviation calculated for each analysis block are determined from transformed coefficients for each of the two adjacent coding blocks partially covered by the analysis block.

According to another special feature of the invention, the weighting factor is obtained by the following formula:

$$w_{i,j}(\mu_{i,j}, \sigma_{i,j}, \zeta) = \begin{cases} \lambda \ln\left(1 + \frac{\sqrt{\mu_{i,j}}}{1 + \sigma_{i,j}}\right) & \text{if } \mu_{i,j} \leq \zeta \\ \ln\left(1 + \frac{\sqrt{255 - \zeta}}{1 + \sigma_{i,j}}\right) & \text{else,} \end{cases}$$

in which $\lambda = \dfrac{\ln\left(1 + \dfrac{\sqrt{255 - \zeta}}{1 + \sigma_{i,j}}\right)}{\ln\left(1 + \dfrac{\sqrt{\zeta}}{1 + \sigma_{i,j}}\right)}$ $\mu_{i,j}$ and $\sigma_{i,j}$ being the average and standard deviation respectively calculated for each analysis block and $\zeta$ being a parameter corresponding to the maximum sensitivity of the human eye.

According to another special feature of the invention, analysis blocks that could contain a block effect are selected before estimating a degradation indicator for each analysis block.

Advantageously, the prior selection comprises a step consisting of separating analysis blocks for which the extracted transformed coefficients are greater than a predetermined threshold.

Preferably, the prior selection comprises a step consisting of selecting analysis blocks with pixels with an energy representing a significant proportion of the energy of the block, at the inter block boundary of the coding grid covered by the analysis block.

According to another special feature of the invention, the coding grid is shifted horizontally with respect to the coded image.

Alternately, the coding grid is shifted vertically with respect to the coded image.

Preferably, the block transform calculation is a discrete cosine transform calculation.

The invention also relates to a system for measuring degradations of a digitized image introduced when coding the image, the system comprising calculation means for implementing the method defined above.

BRIEF DESCRIPTION OF THE DRAWINGS

One preferred embodiment of the invention will be described below as a non-limitative example with reference to the appended figures, wherein.

DETAILED DESCRIPTION OF THE PREFERRED EMBODIMENT(S)

Figure 1:
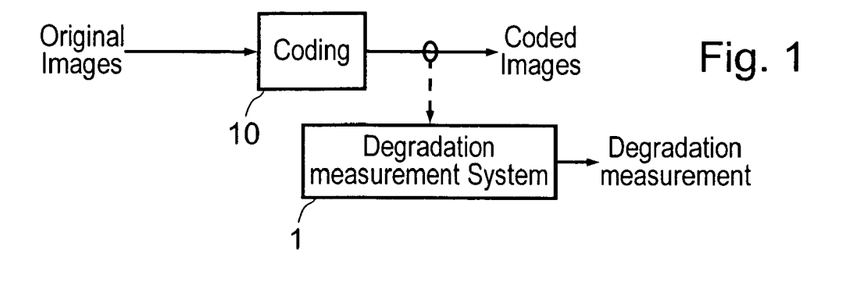
FIG. 1 diagrammatically represents the measurement system according to the invention, integrated into an image processing system.

FIG. 1 represents a degradation measurement system 1 according to the invention that is designed for use as a probe that could be applied to any point in a digital image processing system such as broadcasting system or a video signal production system.

The measurement system 1 is designed particularly to measure the quality of images output from a coding system 10 with reduced throughput respecting the MPEG 2 standard. For this purpose, it is based on a frequency and time filtering combination.

This system is applicable whenever there is a need to identify coding defects in a digital video signal, particularly to determine the appropriate throughput for a given image sequence as a function of the expected quality.

The coding principle according to the MPEG 2 standard consists of dividing the digitized image into blocks of N×N pixels (for example where N is equal to 8) using a coding grid, and applying a discrete cosine transform (DCT) to each block to change from the spatial domain to the frequency domain, and then to cancel some components of the transform corresponding to high frequencies before applying the inverse DCT transformation to change back to the spatial domain, in other words so as to recover the pixels from the corresponding block.

The discrete cosine transform processing consists of making a calculation of transform coefficients AC and DC obtained from the following formulas, to each block $B_{i,j}$ of N×N and pixels in the image:

$$DC_{i,j} = F_{i,j}(0, 0) = \frac{2}{N^2} \sum_{x=0}^{N-1} \sum_{y=0}^{N-1} f_{i,j}(x, y) \quad (1)$$

and $$AC_{i,j}(u, v) = F_{i,j}(u, v), \text{ where } u + v \neq 0 \quad (2)$$

in which $$F_{i,j}(u, v) = \frac{4}{N^2} \sum_{x=0}^{N-1} \sum_{y=0}^{N-1} f_{i,j}(x, y)\cos\left(\pi u\left(\frac{2x+1}{2N}\right)\right)\cos\left(\pi v\left(\frac{2y+1}{2N}\right)\right), \quad (3)$$

$f_{i,j}(x,y)$ represents the luminance of the pixel at point (x,y) in block $B_{i,j}$, x and y being the horizontal position index and the vertical position index respectively of the pixel in the block $B_{i,j}$, and u and v are between 1 and N−1 and represent the indexes of the horizontal and vertical spatial frequencies respectively, and $c(0)=1/\sqrt{2}$ and $c(u)=1$ if $u \neq 0$.

The inverse processing of the discrete cosine transform consists of applying the following formula to the coefficients $DC_{i,j}$ and $AC_{i,j}(u,v)$ of each block $B_{i,j}$:

$$I_{i,j}(x, y) = \frac{4}{N^2} \sum_{u=0}^{N-1} \sum_{v=0}^{N-1} c(u)c(v)F_{i,j}(u, v)\cos\left(\pi u\left(\frac{2x+1}{2N}\right)\right)\cos\left(\pi v\left(\frac{2y+1}{2N}\right)\right) \quad (4)$$

Figure 2:
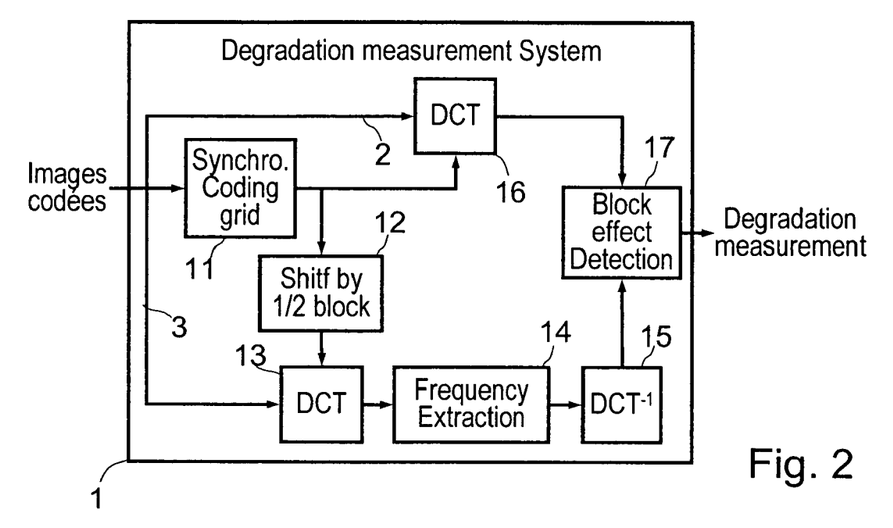
FIG. 2 shows the measurement system represented in FIG. 1 in more detail.

In FIG. 2, the measurement system 1 comprises a synchronisation module 11 that synchronises each coded image to be processed with its coding grid, in other words the module 11 divides the image into blocks of N×N pixels. One example of a synchronisation processing that could be done by this module is described in patent application FR 2 769 452 filed by the Applicant. This synchronisation processing identifies the division into blocks used by the previous coding processing done by the system 10, within the image, and therefore determines the coding block $B_{i,j}$ to which each pixel in the image belongs.

Figure 3:
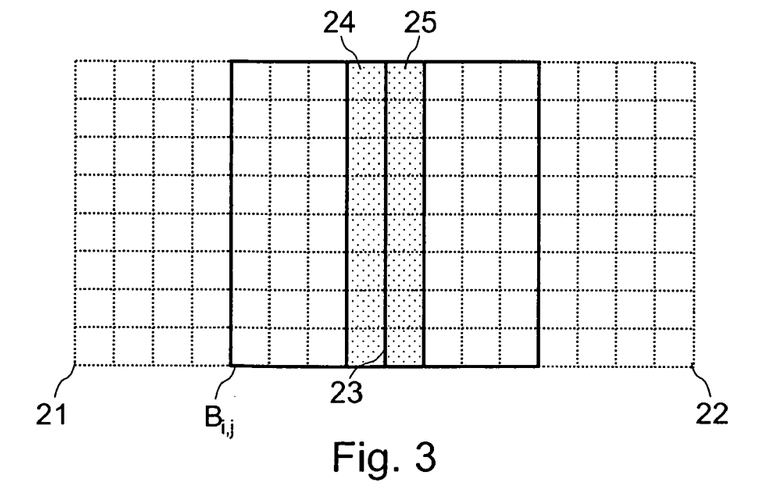
FIG. 3 shows two image pixel blocks to illustrate the method according to the invention.

The coded image and its division into blocks are applied to two processing branches 2, 3, the first branch 2 comprising a discrete cosine transform module 16, and the second branch 3 comprising firstly a shift module 12 producing a horizontal shift of the coding grid by half a block with respect to the image. FIG. 3 illustrates this horizontal shift by half a block, by showing a block $B_{i,j}$ of 8×8 pixels horizontally shifted by half a block with respect to the coding grid illustrated by the adjacent blocks 21 and 22.

In the second processing branch 3, the coded image and the shifted decoding grid at the output from the shift module 12 are applied to the input of a discrete cosine transform module 13. A horizontal frequencies extraction module 14 then processes transform coefficients output from module 13. In fact, this module consists of assuring that the frequency domain only retains frequencies (coefficients $AC_{i,j}(u,v)$ and $DC_{i,j}$) that could make a vertical block effect visible. If N=8, it could thus be estimated that it is only necessary to retain coefficients $DC_{i,j}$, $AC_{i,j}(u,v)$ such that:

$0 \leq u < 8$ if $v=0$, $2 \leq u < 8$ if $v=1$, and $6 \leq u < 8$ if $v=2$

The retained coefficients $AC_{i,j}(u,v)$ and $DC_{i,j}$ are then processed by an inverse DCT transformation module 15 to retrieve spatial information $I_{i,j}(x,y)=I(8i+x, 8j+y)$ related to the retained frequencies obtained using formula (4). In this respect, it is possible to consider only the fourth and fifth columns 24, 25 concerned by the block effect due to coding, and which correspond to the boundary 23 between the blocks 21 and 22 of the coding grid in FIG. 3.

Therefore, the output from branch 3 provides pixel data I(8i+x, 8j+3) and I(8i+x, 8j+4) for the complete image, where i and j are the indexes of shifted blocks of the image using the shifted coding grid obtained at the output from the shift module 12. The output from branch 2 provides coefficients $DC_{i,j}$ and $AC_{i,j}(u,v)$ for each image block related to the coding grid at the output from the synchronisation module 11. For each shifted block $B_{i,j}$, the coefficients $DC_{i,j}^G$ and $AC_{i,j}^G$ (u,v) in the left block 21 and the coefficients $DC_{i,j}^D$ and $AC_{i,j}^D$ (u,v) of the right block 22 are available.

The data output from the two processing branches 2 and 3, in other words at the output from modules 16 and 15, are applied to the input of a block effect evaluation module 17.

Figure 4:
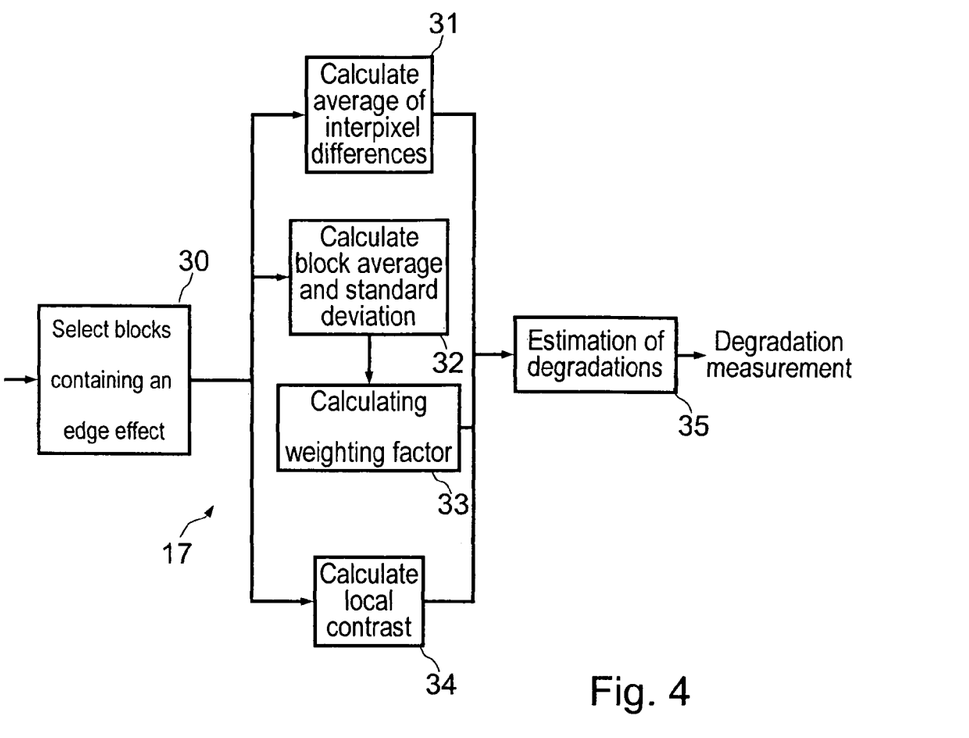
FIG. 4 shows part of the system shown in FIG. 2 in more detail.

The data at the input to module 17 shown in FIG. 4 are applied to the following modules:

- a module 31 for calculating the average of inter pixel differences at the vertical boundary 23 between each pair of adjacent blocks 21, 22 in the coded image;
- a module 32 for calculating the average and the standard deviation of the luminance of each block; and
- a local contrast calculation module 34.

The module 31 applies the following formula to pixel data output from the second branch 3, to evaluate the average of inter pixel differences on each shifted block $B_{i,j}$:

$$\Delta_{i,j} = \frac{1}{8} \sum_{k=0}^{7} |I(8i+k, 8j+4) - (8i+k, 8j+3)| \quad (5)$$

The average thus calculated actually describes the behaviour of the gradient operator at the vertical boundary 23 of two adjacent blocks 21, 22 output from the image coding grid.

In module 32, an average $\mu_{i,j}$ and a standard deviation $\sigma_{i,j}$ of the luminance are estimated for each block $B_{i,j}$ on the two corresponding adjacent blocks 21, 22 in the coding grid. For example, the AC and DC coefficients of the coding blocks in the DCT domain output by the first branch 2 could be used according to the following formulas:

$$\mu_{i,j} = \frac{1}{2}(DC_{i,j}^G + DC_{i,j}^D) \quad (6)$$

and $$\sigma_{i,j} = \frac{1}{2}\left(\sqrt{\frac{1}{63} \sum_{\substack{u,v=0 \\ u+v \neq 0}}^{7} [AC_{i,j}^G(u,v)]^2} + \sqrt{\frac{1}{63} \sum_{\substack{u,v=0 \\ u+v \neq 0}}^{7} [AC_{i,j}^D(u,v)]^2}\right) \quad (7)$$

Obviously, the average $\mu_{i,j}$ and the standard deviation $\sigma_{i,j}$ could also be obtained directly from the pixels of blocks 21, 22 corresponding to each block $B_{i,j}$ using classical formulas for calculating the average and the standard deviation.

The averages and standard deviations calculated by the module 32 are then applied to a module 33 for calculation of a weighting factor $w_{i,j}(\mu_{i,j}, \sigma_{i,j}, \zeta)$ for each block $B_{i,j}$. The module 33 applies the weighting function defined by the following formula to calculate this weighting factor:

$$w_{i,j}(\mu_{i,j}, \sigma_{i,j}, \zeta) = \begin{cases} \lambda \ln\left(1 + \frac{\sqrt{\mu_{i,j}}}{1+\sigma_{i,j}}\right) & \text{if } \mu_{i,j} \leq \zeta \\ \ln\left(1 + \frac{\sqrt{255-\zeta}}{1+\sigma_{i,j}}\right) & \text{else,} \end{cases} \quad (8)$$

-continued $$\text{where } \lambda = \frac{\ln\left(1 + \frac{\sqrt{255-\zeta}}{1+\sigma_{i,j}}\right)}{\ln\left(1 + \frac{\sqrt{\zeta}}{1+\sigma_{i,j}}\right)} \quad (9)$$

and $\zeta$ is a parameter corresponding to the maximum sensitivity of the eye.

This weighting function is described in the publication "A Generalized Block-Edge Impairment Metric for Video Coding" by H. R Wu and M. Yuen, IEEE Signal Processing Letters, Vol. 4, No. 11, November 1997. However, the weighting function described in this publication has a discontinuity at point $\mu_{i,j}=\zeta$ when the standard deviation $\sigma_{i,j}$ is not zero. Therefore, this function is adapted in the method according to the invention to be continuous at this point.

Figure 5:
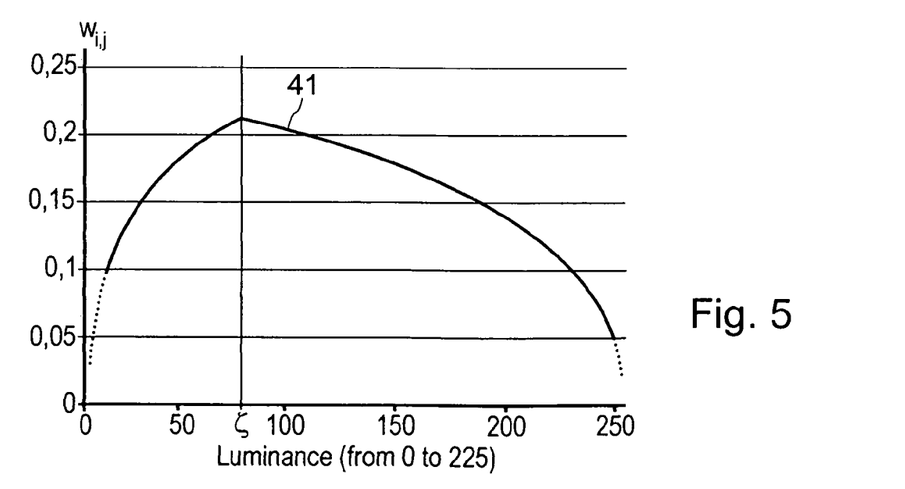
FIG. 5 shows a curve representing a weighting function used by the method according to the invention.

FIG. 5 illustrates this weighting function in the form of a curve 41 as a function of the grey level or the average luminance $\mu_{i,j}$ of pixels in the block, in the case in which $\zeta$ is chosen to be equal to 81, corresponding to the maximum sensitivity of the human eye, and where $\sigma$ is equal to 20.

The local contrast calculation performed by module 34 consists in estimating the spatial activity $ACT_{i,j}$ of each block $B_{i,j}$ in the transform domain, starting from coefficients $DC_{i,j}$ and $AC_{i,j}$, the coefficients $AC_{i,j}$ being weighted by a masking function to model masking by the neighbourhood. The spatial activity $ACT_{i,j}$ of each block $B_{i,j}$ is thus estimated by applying the following formula:

$$ACT_{i,j} = \frac{1}{2}(ACT_{i,j}^G + ACT_{i,j}^D) \quad (10)$$

$$\text{where } ACT_{i,j}^G = \frac{1}{1+DC_{i,j}^G} \sqrt{\sum_{\substack{u,v=0 \\ u+v \neq 0}}^{7} [AC_{i,j}^G(u,v)Nill(u,v)]^2} \quad (11)$$

$$\text{and } ACT_{i,j}^D = \frac{1}{1+DC_{i,j}^D} \sqrt{\sum_{\substack{u,v=0 \\ u+v \neq 0}}^{7} [AC_{i,j}^D(u,v)Nill(u,v)]^2} \quad (12)$$

in which Nill(u,v) is the masking function that can for example be the function described in the document "A Visual Model Weighted Cosine Transform for Image Compression and Quality Assessment" by N. B. Nill, IEEE Transactions on Communications, Vol. COM-33, No. 6, June 1985.

In this document, the masking function is given by the following formula:

$$\text{Nill}(u,v) = A(\omega)H(\omega) \quad (13)$$

where $\omega = \sqrt{u^2+v^2}$ represents the radial frequency expressed in cycles per degree (u and $v \in [0, N-1]$), $$A(\omega) = \sqrt{\frac{1}{4} + \frac{1}{\pi^2}\left[\ln\left(\frac{2\pi\pi}{\alpha} + \sqrt{\frac{4\pi\pi^2\omega}{\alpha^2} + 1}\right)\right]^2}, \quad (14)$$

$$H(\omega) = (0.31 + 0.69\omega)e^{-0.29\omega} \quad (15)$$

and α is commonly equal to 11.636 deg$^{-1}$ for processing of luminance on 8 bits.

Figure 6:
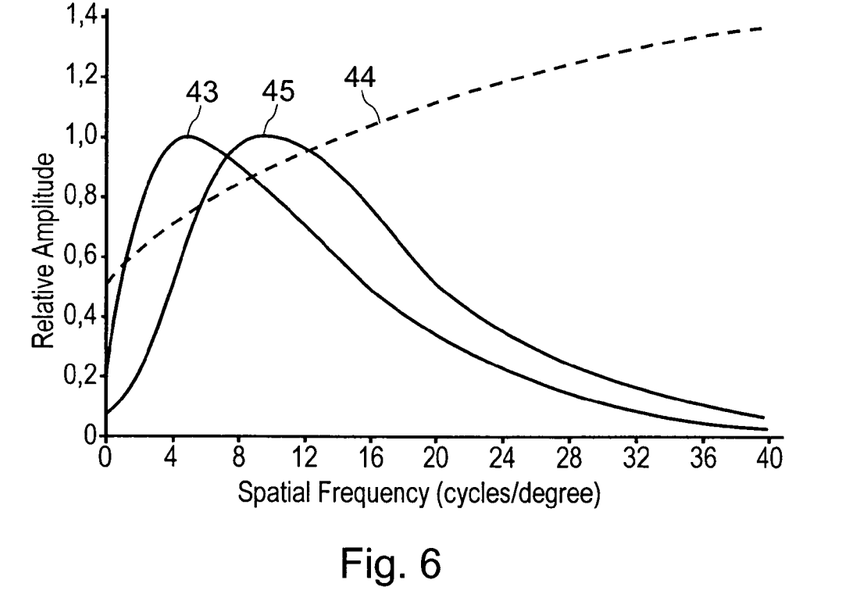
FIG. 6 shows other curves illustrating another weighting function used by the method according to the invention.

FIG. 6 illustrates this weighting function by representing the curve 43 showing the variation of H(ω), the curve 44 showing the variation of A(ω) and the curve 45 showing the variation of the function Nill(ω), as a function of the spatial frequency ω.

In formulas (11) and (12), normalisation by the DC coefficient provides a means for considering the match to the local contrast in accordance with the Weber's law, and one is added to the denominator so that the function is continuous at zero.

Finally, the results of calculations carried out by modules 31, 33 and 34 are applied to a module 35 for evaluation of the image degradation u due to the edge effect resulting from coding. This module carries out the following calculation to estimate an image degradation measurement:

$$\upsilon = \sum_{i,j} \upsilon_{i,j} \quad (16)$$

$$\text{where } \upsilon_{i,j} = \frac{\Delta I_{i,j} w_{i,j}(\mu_{i,j}, \sigma_{i,j}, \zeta)}{1 + \psi |ACT_{i,j}|} \quad (17)$$

represents the impact of block effects on block $B_{i,j}$ and ψ is an experimentally determined constant that adjusts the importance assigned to the spatial activity compared with the weighted average of inter pixel differences.

The measurement of the degradation U estimated by this module corresponds to an indicator of the visibility by the human eye of degradations due to the block effect.

Figure 7:
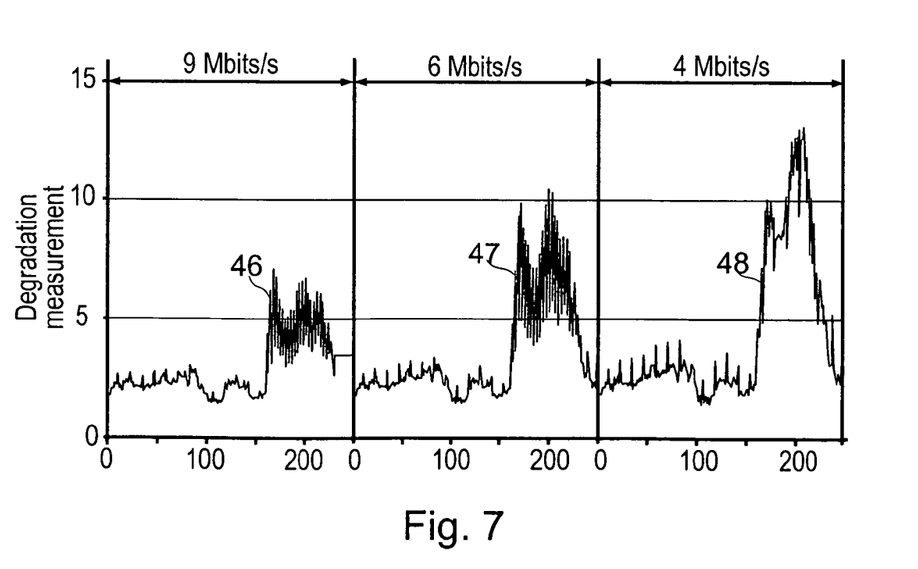
FIG. 7 shows curves illustrating the variation in degradation measurements obtained using the method according to the invention applied to a sequence of images.

FIG. 7 shows variations of this measurement in the shape of curves 46, 47, 48, as a function of the image number in a sequence of video images, for throughputs of 9, 6 and 4 Mbits/s respectively.

These curves show that image degradations are amplified as the throughput is reduced. Therefore, the coarse coding by quantification of DCT coefficients results in the block effect. The part of the image sequence in which the degradation measurement is high corresponds to images for which the spatial and time contents change suddenly.

Processing done by module 17 can be optimized by submitting input block data to a selection using a module for selection of blocks $B_{ij}$ that could contain a block effect. To achieve this, this module compares the energy of central columns 24 and 25 of each block $B_{ij}$ with energy of the block. The block is selected to estimate the degradation if the energy of columns 24 and 25 represents a significant proportion, for example more than 25%, of the total energy of the block. Before this selection is made, blocks for which the DCT coefficients selected by the extraction module 14 are below a predefined threshold, for example close to zero, can be eliminated.

Note that the processing that has just been described is designed to detect a vertical block effect. Obviously, this processing could be modified in an easily understood manner to detect a horizontal block effect. All that is necessary in module 12 is to make a vertical shift of a half block, and then in the frequency extraction module 14 to select frequencies that could be affected by a horizontal block effect, and finally in module 15 to consider all of the reconstituted pixels and only retain pixels in the fourth and fifth lines of the shifted block corresponding to the horizontal boundary between the two adjacent non-shifted blocks corresponding to the shifted block.

It would also be possible to perform vertical and horizontal block effect detection processings in parallel, and to use the results output by these two processings at the same time, for example in module 35.

After comparing objective measurements obtained by the method and the system according to the invention, with marks assigned during subjective tests by panels of representative persons, it is found that there is a strong correlation between objective measurements and subjective measurements, confirming that the method and system according to the invention are efficient.

The invention claimed is:

1. A method for measuring degradations of a digitized image introduced when coding the image, said method comprising the steps of:

dividing the image into coding blocks using a coding grid, applying a coding processing on pixel data in each said block, making use of a block transform calculation and an inverse block transform calculation, determining the coding grid of the coded image, in order to find an image division into coding blocks, used when coding the image, shifting the coding grid with respect to the coded image, so as to define an image division into analysis blocks each covering a boundary between two adjacent coding blocks, applying the block transform calculation to pixel data in the coded image using the shifted coding grid to obtain transformed coefficients for each analysis block defined by the shifted coding grid, extracting coefficients that could be affected by a block effect resulting from coding of the image, from the transformed coefficients, applying the inverse block transform calculation to the extracted transformed coefficients to determine the pixel data for each analysis block, for each analysis block, estimating an indicator of the degradation due to block effects, using pixel data in the coded image and pixel data in each analysis block, obtained by the inverse transform calculation, and determining an image degradation measurement by summing the degradation indicators of each analysis block.

2. The method according to claim 1, wherein the estimation of a degradation indicator for each analysis block comprises the steps of:

calculating an average of inter pixel differences at the inter block boundary of the coding grid, covered by the analysis block, using pixel data obtained for the analysis block, calculating an average and a standard deviation applicable to pixels in the two adjacent blocks on the coding grid, partially covered by the analysis block, calculating a weighting factor as a function of the average and the standard deviation obtained for the analysis block, and calculating a spatial activity of the analysis block using spatial activities determined for each of the two adjacent blocks in the coding grid partially covered by the analysis block, the analysis block degradation indicator being determined as a function of the calculated average of inter pixel differences, the weighting factor and the spatial activity of the block.

3. The method according to claim 2, wherein the analysis block degradation indicator u is obtained using the following formula:

$$v_{i,j} = \frac{\Delta I_{i,j} w_{i,j}}{1 + \psi |ACT_{i,j}|}$$

in which $\Delta I_{i,j}$ is the average of inter pixel differences at the inter block boundary of the coding grid covered by the analysis block, $w_{i,j}$ is the weighting factor, $\psi$ is a predefined constant, and $ACT_{i,j}$ is the spatial activity of the analysis block.

4. The method according to claim 2, wherein the transform calculation is applied to coding blocks of the coded image, the spatial activities determined for each of the two coding blocks being obtained from the transformed coefficients for each of the two coding blocks.

5. The method according to claim 4, wherein the spatial activities determined for each of the two coding blocks are obtained from the following formulas:

$$ACT_{i,j}^G = \frac{1}{1 + DC_{i,j}^G} \sqrt{\sum_{\substack{u,v=0 \\ u+v \neq 0}}^{7} [AC_{i,j}^G(u,v) Nill(u,v)]^2}$$

$$ACT_{i,j}^D = \frac{1}{1 + DC_{i,j}^D} \sqrt{\sum_{\substack{u,v=0 \\ u+v \neq 0}}^{7} [AC_{i,j}^D(u,v) Nill(u,v)]^2}$$

in which $DC_{i,j}^G$ and $AC_{i,j}^G(u,v)$ and $DC_{i,j}^D$ and $AC_{i,j}^D(u,v)$ are the transformed coefficients for each of the two adjacent coding blocks partially covered by the analysis block, and $Nill(u,v)$ is a masking function modelling masking by neighbourhood.

6. The method according to claim 2, wherein the average and standard deviation calculated for each analysis block are determined from transformed coefficients for each of the two adjacent coding blocks partially covered by the analysis block.

7. The method according to claim 2, wherein the weighting factor $w_{i,j}$ is obtained by the following formula:

$$w_{i,j}(\mu_{i,j}, \sigma_{i,j}, \zeta) = \begin{cases} \lambda \ln\left(1 + \frac{\sqrt{\mu_{i,j}}}{1 + \sigma_{i,j}}\right) & \text{if } \mu_{i,j} \leq \zeta \\ \ln\left(1 + \frac{\sqrt{255 - \zeta}}{1 + \sigma_{i,j}}\right) & \text{else,} \end{cases}$$

in which $\lambda = \dfrac{\ln\left(1 + \dfrac{\sqrt{255 - \zeta}}{1 + \sigma_{i,j}}\right)}{\ln\left(1 + \dfrac{\sqrt{\zeta}}{1 + \sigma_{i,j}}\right)}$ $\mu_{i,j}$ and $\sigma_{i,j}$ are the average and standard deviation respectively calculated for each analysis block and $\zeta$ is a parameter corresponding to the maximum sensitivity of the human eye.

8. The method according to claim 1, further comprising a prior selection step of selection of analysis blocks that could contain a block effect before estimating a degradation indicator for each analysis block.

9. The method according to claim 8, wherein the prior selection step comprises a step of separating analysis blocks for which the extracted transformed coefficients are greater than a predetermined threshold.

10. The method according to claim 8, wherein the prior selection step comprises a step of selecting analysis blocks with pixels with an energy representing a significant proportion of the energy of the block, at the inter block boundary of the coding grid covered by the analysis block.

11. The method according to claim 1, wherein the coding grid is shifted horizontally with respect to the coded image.

12. The method according to claim 1, wherein the coding grid is shifted vertically with respect to the coded image.

13. The method according to claim 1, wherein the block transform calculation is a discrete cosine transform calculation.

14. A system for measuring degradations of a digitized image introduced when coding the image, said system comprising calculation means for:
 dividing the image into coding blocks using a coding grid,
 applying a coding processing on pixel data in each block, making use of a block transform calculation and an inverse block transform calculation,
 determining the coding grid of the coded image, in order to find the image division into coding blocks, used when coding the image,
 shifting the coding grid with respect to the coded image, so as to define an image division into analysis blocks each covering a boundary between two adjacent coding blocks,
 applying the block transform calculation to pixel data in the coded image using the shifted coding grid to obtain transformed coefficients for each analysis block defined by the shifted coding grid,
 extracting coefficients that could be affected by a block effect resulting from coding of the image, from the transformed coefficients,
 applying the inverse block transform calculation to the extracted transformed coefficients to determine the pixel data for each analysis block,
 for each analysis block, estimating an indicator of the degradation due to block effects, using pixel data in the coded image and pixel data in each analysis block, obtained by the inverse transform calculation, and
 determining an image degradation measurement by summing the degradation indicators of each analysis block.

15. The system according to claim 14, wherein the calculation means for estimating a degradation indicator for each analysis block comprises means for:
 calculating an average of inter pixel differences at the inter block boundary of the coding grid, covered by the analysis block, using pixel data obtained for the analysis block,
 calculating an average and a standard deviation applicable to pixels in the two adjacent blocks on the coding grid, partially covered by the analysis block,
 calculating a weighting factor as a function of the average and the standard deviation obtained for the analysis block, and
 calculating a spatial activity of the analysis block using spatial activities determined for each of the two adjacent blocks in the coding grid partially covered by the analysis block, the analysis block degradation indicator being determined as a function of the calculated average of inter pixel differences, the weighting factor and the spatial activity of the block.

16. The system according to claim 15, wherein the analysis block degradation indicator $\upsilon_{i,j}$ is obtained using the following formula:

$$\upsilon_{i,j} = \frac{\Delta I_{i,j} w_{i,j}}{1 + \psi |ACT_{i,j}|}$$

in which $\Delta I_{i,j}$ is the average of inter pixel differences at the inter block boundary of the coding grid covered by the analysis block, $w_{i,j}$ is the weighting factor, $\psi$ is a predefined constant, and $ACT_{i,j}$ is the spatial activity of the analysis block.

17. The system according to claim 15, wherein the transform calculation is applied to coding blocks of the coded image, the spatial activities determined for each of the two coding blocks being obtained from the transformed coefficients for each of the two coding blocks.

18. The system according to claim 17, wherein the spatial activities determined for each of the two coding blocks are obtained from the following formulas:

$$ACT_{i,j}^G = \frac{1}{1+DC_{i,j}^G} \sqrt{\sum_{\substack{u,v=0 \\ u+v \neq 0}}^{7} [AC_{i,j}^G(u,v) Nill(u,v)]^2}$$

$$ACT_{i,j}^D = \frac{1}{1+DC_{i,j}^D} \sqrt{\sum_{\substack{u,v=0 \\ u+v \neq 0}}^{7} [AC_{i,j}^D(u,v) Nill(u,v)]^2}$$

in which $DC_{i,j}^G$ and $AC_{i,j}^G(u,v)$ and $DC_{i,j}^D$ and $AC_{i,j}^D(u,v)$ are the transformed coefficients for each of the two adjacent coding blocks (partially covered by the analysis block, and $Nill(u,v)$ is a masking function modelling masking by neighbourhood.

19. The system according to claim 15, wherein the average and standard deviation calculated for each analysis block are determined from transformed coefficients for each of the two adjacent coding blocks partially covered by the analysis block.

20. The system according to claim 15, wherein the weighting factor $w_{i,j}$ is obtained by the following formula:

$$w_{i,j}(\mu_{i,j}, \sigma_{i,j}, \zeta) = \begin{cases} \lambda \ln\left(1 + \frac{\sqrt{\mu_{i,j}}}{1+\sigma_{i,j}}\right) & \text{if } \mu_{i,j} \leq \zeta \\ \ln\left(1 + \frac{\sqrt{255-\zeta}}{1+\sigma_{i,j}}\right) & \text{else,} \end{cases}$$

$$\text{in which } \lambda = \frac{\ln\left(1 + \frac{\sqrt{255-\zeta}}{1+\sigma_{i,j}}\right)}{\ln\left(1 + \frac{\sqrt{\zeta}}{1+\sigma_{i,j}}\right)}$$

$\mu_{i,j}$ and $\sigma_{i,j}$ are the average and standard deviation respectively calculated for each analysis block and $\zeta$ is a parameter corresponding to the maximum sensitivity of the human eye.

21. The system according to claim 14, further comprising prior selection means for selecting analysis blocks that could contain a block effect, before estimating a degradation indicator for each analysis block.

22. The system according to claim 21, wherein the prior selection means comprise means for separating analysis blocks for which the extracted transformed coefficients are greater than a predetermined threshold.

23. The system according to claim 21, wherein the prior selection means comprise means for selecting analysis blocks with pixels with an energy representing a significant proportion of the energy of the block, at the inter block boundary of the coding grid covered by the analysis block.

24. The system according to claim 14, wherein the coding grid is shifted horizontally with respect to the coded image.

25. The system according to claim 14, wherein the coding grid is shifted vertically with respect to the coded image.

26. The system according to claim 14, wherein the block transform calculation is a discrete cosine transform calculation.

* * * * *